United States Patent
Okamura et al.

(10) Patent No.: US 10,558,115 B2
(45) Date of Patent: Feb. 11, 2020

(54) CONTROL APPARATUS, PROJECTION DISPLAY APPARATUS AND NON-TRANSITORY COMPUTER-READABLE STORAGE MEDIUM

(71) Applicant: CANON KABUSHIKI KAISHA, Tokyo (JP)

(72) Inventors: Takahiro Okamura, Utsunomiya (JP); Daisaku Nagahama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/117,955

(22) Filed: Aug. 30, 2018

(65) Prior Publication Data

US 2019/0072842 A1 Mar. 7, 2019

(30) Foreign Application Priority Data

Sep. 4, 2017 (JP) .................. 2017-169116

(51) Int. Cl.
G03B 21/20 (2006.01)
H04N 5/235 (2006.01)
H04N 5/57 (2006.01)
H04N 5/74 (2006.01)

(52) U.S. Cl.
CPC ..... *G03B 21/2053* (2013.01); *G03B 21/2046* (2013.01); *H04N 5/2353* (2013.01); *H04N 5/57* (2013.01); *H04N 5/7441* (2013.01)

(58) Field of Classification Search
CPC ............... G03B 21/206; G03B 21/208; G03B 21/2046; G03B 21/2053; H04N 9/3152; H04N 9/3155; H04N 9/3164
See application file for complete search history.

(56) References Cited

U.S. PATENT DOCUMENTS

| 7,530,695 | B2 | 5/2009 | Furihata |
| 9,412,310 | B2 | 8/2016 | Nobori et al. |
| 9,588,410 | B2 | 3/2017 | Horiguchi et al. |
| 2009/0284544 | A1* | 11/2009 | Nobori ................ G09G 3/3406 345/589 |

(Continued)

FOREIGN PATENT DOCUMENTS

| JP | 2006064825 A | 3/2006 |
| JP | 2006106691 A | 4/2006 |

(Continued)

OTHER PUBLICATIONS

Office Action issued in U.S. Appl. No. 16/117,655 dated Apr. 29, 2019.

(Continued)

*Primary Examiner* — Sultan Chowdhury
(74) *Attorney, Agent, or Firm* — Rossi, Kimms & McDowell LLP

(57) ABSTRACT

A control apparatus includes a calculator that calculates a target dimming rate of a projection display apparatus based on a feature quantity of image data, a diaphragm controller that controls a diaphragm position of a diaphragm based on a target diaphragm position set for each range to which the target dimming rate belongs, and a light source controller that controls a light quantity of a light source on the basis of the target dimming rate and the diaphragm position.

17 Claims, 13 Drawing Sheets

(56) References Cited

U.S. PATENT DOCUMENTS

| | | | | |
|---|---|---|---|---|
| 2013/0044297 A1* | 2/2013 | Horiguchi | ............ | H04N 9/3155 |
| | | | | 353/85 |
| 2013/0201409 A1 | 8/2013 | Yuzawa | | |
| 2014/0368746 A1* | 12/2014 | Sugiyama | ............ | H04N 5/7416 |
| | | | | 348/759 |
| 2015/0348506 A1* | 12/2015 | Ooga | ....................... | G09G 5/10 |
| | | | | 345/205 |

FOREIGN PATENT DOCUMENTS

| | | | |
|---|---|---|---|
| JP | 4238765 | B2 | 3/2009 |
| JP | 2012103642 | A | 5/2012 |
| JP | 2013057930 | A | 3/2013 |
| JP | 2014187460 | A | 10/2014 |

OTHER PUBLICATIONS

Copending U.S. Appl. No. 16/117,655, filed Aug. 30, 2018.
Notice of Allowance issued in U.S. Appl. No. 16/117,655 dated Sep. 10, 2019.

* cited by examiner

| DIAPHRAGM DIMMING RATE | 40% | 60% | 80% | 100% |
|---|---|---|---|---|
| UPPER THRESHOLD | 35% | 55% | 75% | - |
| LOWER THRESHOLD | - | 25% | 45% | 65% |

←DIAPHRAGM DIMMING RATE - 5%

←DIAPHRAGM DIMMING RATE LOWER BY ONE STAGE - 15%

| TARGET DIMMING RATE | DIAPHRAGM DIMMING RATE |
|---|---|
| UNDER 40% | 40% |
| OVER 40% TO ≤60% | 60% |
| OVER 60% TO ≤80% | 80% |
| OVER 80% | 100% |

| DIAPHRAGM DIMMING RATE | 50% | 60% | 70% | 80% | 90% | 100% |
|---|---|---|---|---|---|---|
| UPPER THRESHOLD | 47% | 57% | 67% | 77% | 87% | - |
| LOWER THRESHOLD | - | 42% | 52% | 62% | 72% | 82% |

← DIAPHRAGM DIMMING RATE - 3%

← DIAPHRAGM DIMMING RATE LOWER BY ONE STAGE - 8%

FIG. 8

CONTROL APPARATUS, PROJECTION DISPLAY APPARATUS AND NON-TRANSITORY COMPUTER-READABLE STORAGE MEDIUM

BACKGROUND OF THE INVENTION

Field of the Invention

The present invention relates to a control apparatus, a projection display apparatus and a non-transitory computer-readable storage medium.

Description of the Related Art

Conventionally, to improve a contrast of an image projected by a projection display apparatus, a control method of an emission light quantity of a light source and a control method of a light quantity outputted using a diaphragm has been proposed. Japanese Patent No. 4238765 discloses a method to adjust a light quantity outputted by combining a control of an emission light quantity of a light source and a control of a diaphragm to suppress deterioration of a diaphragm when a shielding light quantity of the diaphragm is large. In addition, Japanese Patent Laid-Open No. ("JP") 2013-57930 discloses a method to balance dimming rates of lamp dimming and shutter dimming to suppress deterioration of a lamp life occurring when a lump light source lowers a light quantity in addition to deterioration of a diaphragm.

However, in the methods of Japanese Patent No. 4238765 and JP 2013-57930, the diaphragm is mainly used, and when performing dimming frequently is necessary, due to continuous operation of a motor for driving the diaphragm, driving sound of the motor may be heard as noise, or the motor may be deteriorated.

SUMMARY OF THE INVENTION

The present invention provides a control apparatus, a projection display apparatus and a non-transitory computer-readable storage medium capable of suppressing driving sound and deterioration of a motor due to continuous operation of a diaphragm.

A control apparatus according to the present invention includes a calculator that calculates a target dimming rate of a projection display apparatus based on a feature quantity of image data, a diaphragm controller that controls a diaphragm position of a diaphragm based on a target diaphragm position set for each range to which the target dimming rate belongs, and a light source controller that controls a light quantity of a light source on the basis of the target dimming rate and the diaphragm position.

Further features of the present invention will not be apparent from the following description of the example description with reference to the attached drawings.

BRIEF DESCRIPTION OF THE DRAWINGS

FIG. 8 is a table showing an example of a threshold corresponding to a diaphragm dimming rate according to the second embodiment.

DESCRIPTION OF THE EMBODIMENTS

Figure 1:
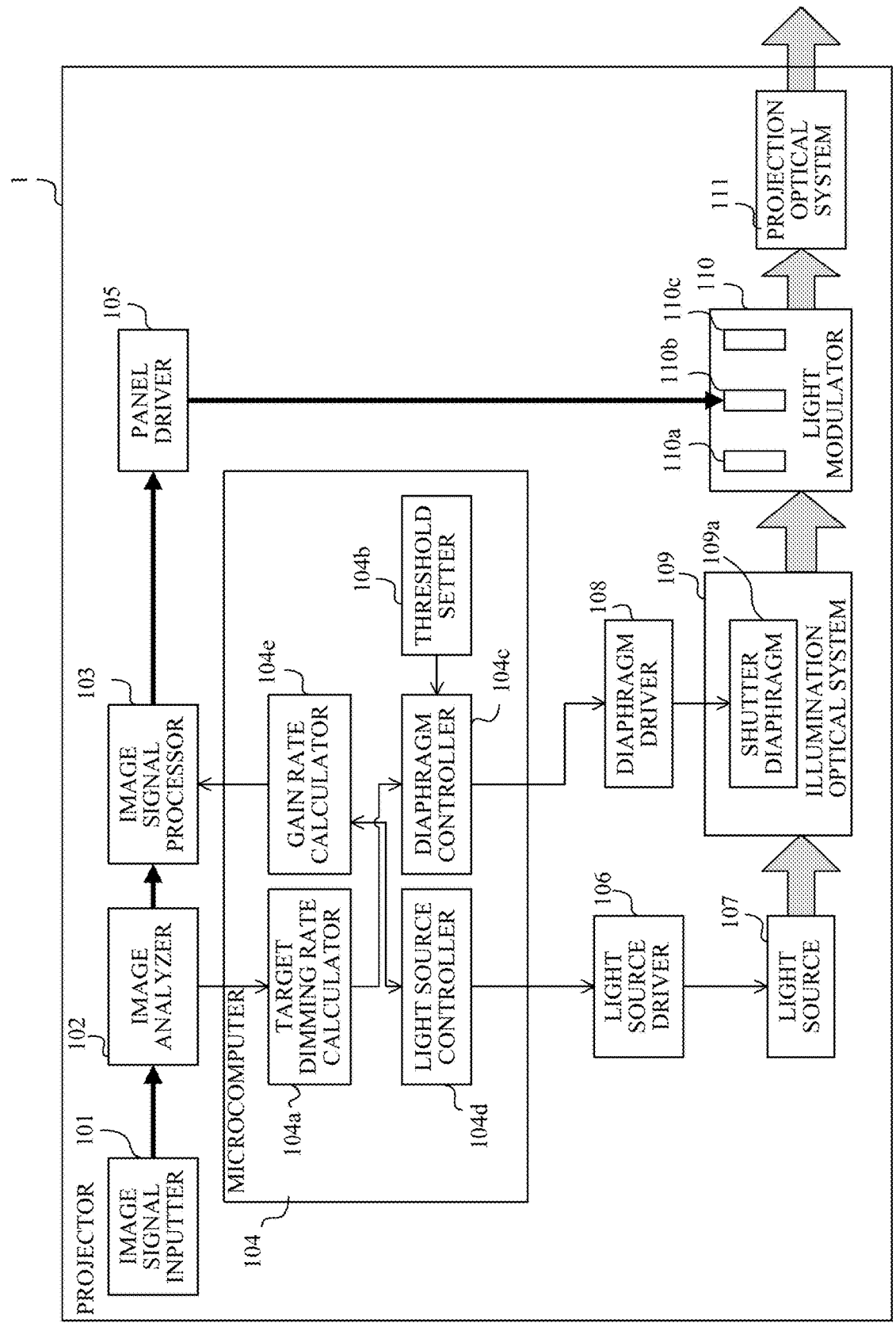
FIG. 1 is a block diagram of a projection display apparatus according to a first embodiment.

A description will be given of embodiments of the present invention with reference to the accompanying drawings. Corresponding elements in each figure will be designated by the same reference numerals, and a description thereof will be omitted.

First Embodiment

First, referring to FIG. 1, a description will be given of a projection display apparatus according to this embodiment. FIG. 1 is a block diagram of a projector 1 which is the projection display apparatus according to this embodiment.

An image signal inputter 101 includes an interface connector for image signal input and receives an image signal (image data) from an outside of the projector 1. Having a signal form corresponding to each transmission format when passing through a cable, the image signal is converted into a signal format, which can be easily processed in subsequent image processing, by the image signal inputter 101. The converted image signal is transmitted to an image analyzer 102.

The image analyzer 102 receives the image signal transmitted from the image signal inputter 101 and analyzes the image. The image analyzer 102 obtains the brightest brightness value, the darkest brightness value, a brightness average value of all pixels, and the like from the image for each frame. Further, the image analyzer 102 may obtain the above-mentioned information from a histogram of a brightness gradation value and each block in a state of dividing a screen into a plurality of blocks. The image analyzer 102 transmits the image signal received from the image signal inputter 101 as it is to an image signal processor 103 and transmits obtained analysis information to the controller (controller) 104.

The image signal processor 103 performs various processes such as keystone correction, scaling, brightness correction, contrast correction, and color correction on the image signal received from the image analyzer 102. The image signal processed by the image signal processor 103 is transmitted to the panel driver 105.

The controller 104 includes a microcomputer (processor) and controls each unit in the projector 1 according to a control program as a computer program.

A target dimming rate calculator (calculator) 104a calculates a target dimming rate, which is a target value of a light quantity adjustment in the entire projector 1, based on analysis information (feature quantity) obtained from the image analyzer 102. In this embodiment, the target dimming rate calculator 104a calculates the target dimming rate as a ratio to an output light quantity when the diaphragm is an open state and a light quantity of the light source is 100%. That is, the state where the dimming rate is 100% is the state where the diaphragm is the open state and the light quantity of the light source is 100%. In this embodiment, the target dimming rate is calculated using the above method, but the present invention is not limited to this.

Figures 3A, 3B, 4:
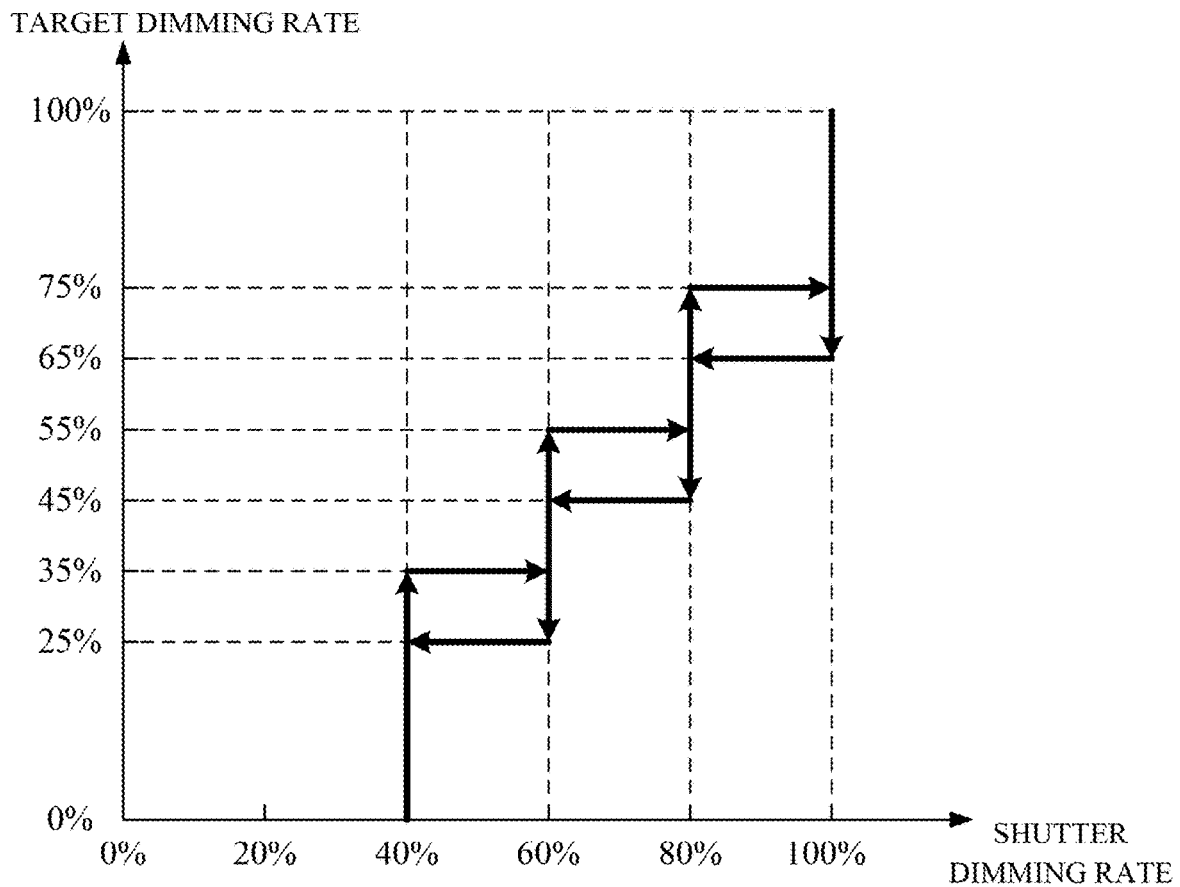
FIGS. 3A and 3B are tables showing an example of a threshold corresponding to a diaphragm dimming rate according to the first embodiment.
FIG. 4 is a graph showing the threshold corresponding to the diaphragm dimming rate according to the first embodiment.

A threshold setter 104b sets a change range of the target dimming rate, which is used when switching a diaphragm dimming rate of a shutter diaphragm 109a to block a light flux in an illumination optical system 109, for each diaphragm dimming rate. Setting the change range of the target dimming rate is paraphrased as setting a threshold which is an end of the change range. Referring to FIGS. 3A and 3B, a description will be given of setting the threshold for each diaphragm dimming rate by the threshold setter 104b. The threshold setter 104b may set the threshold in conjunction with a user operation from a menu or the like and an image mode.

A diaphragm controller 104c calculates a diaphragm dimming rate (target diaphragm dimming rate) based on the target dimming rate calculated by the target dimming rate calculator 104a and the threshold set by the threshold setter 104b. The diaphragm controller 104c obtains a diaphragm position (opening diameter) of the shutter diaphragm 109a corresponding to the calculated diaphragm dimming rate. In this embodiment, the diaphragm controller 104c controls the diaphragm position of the shutter diaphragm 109a corresponding to the diaphragm dimming rate calculated by a correspondence table of the diaphragm dimming rate and the diaphragm position stored in advance in a storage (not illustrated). The diaphragm controller 104c drives a diaphragm driver 108 so that the diaphragm position of the shutter diaphragm 109a becomes the obtained diaphragm position. That is, the diaphragm controller 104c controls the light quantity adjustment by the shutter diaphragm 109a. Since dimming can be performed according to an image change, the diaphragm position of the shutter diaphragm 109a is preferably changed in synchronism with a vertical synchronizing signal of the image. In this embodiment, the shutter diaphragm is used as a light shielding unit, but a glow-stop or the like may be used.

A light source controller 104d calculates a light source dimming rate (target light source dimming rate) to reach the target dimming rate based on the target dimming rate calculated by the target dimming rate calculator 104a and the diaphragm dimming rate obtained by the diaphragm controller 104c. The light source dimming rate is a ratio of a target output light quantity to the maximum output light quantity of the light source 107. In this embodiment, the light source controller 104d calculates the light source dimming rate by subtracting the diaphragm dimming rate from the target dimming rate. The light source controller 104d obtains a light source set value of the light source 107 corresponding to the light source dimming rate calculated using a correspondence table of the light source dimming rate stored in advance in a storage (not illustrated) and a light quantity set value. The storage may hold a conversion expression between the light source dimming rate and the light quantity set value instead of the correspondence table. The light source controller 104d drives the light source driver 106 so that the light quantity of the light source 107 becomes the obtained light quantity set value. That is, the light source controller 104d controls the light quantity of the light source 107. The light source controller 104d may use the obtained value as the light quantity set value as when the light quantity set value can be set steplessly, but may use the closest or rounded value from the obtained value as the light quantity set value when the light quantity set value can be set stepwise. Further, since dimming can be performed according to an image change, the light quantity of the light source 107 is preferably changed in synchronism with a vertical synchronizing signal of the image.

A gain rate calculator (gain calculator) 104e calculates a gain adjustment rate that performs image expansion based on the target dimming rate or the diaphragm dimming rate, and the light source dimming rate. The image signal processor 103 carries out gain processing on the image signal received from the image analyzer 102 based on the gain adjustment rate received from the gain rate calculator 104e to expand the image. Performing gain processing on the image based on the gain adjustment rate can brighten the image darkened by dimming to the target dimming rate, and can maintain brightness in a bright part of the image.

The light source driver 106 is an electrical circuit for driving the light source 107 under a control of the diaphragm controller 104c to change the light quantity of the light source 107. The light source driver 106 has a configuration according to a method of the light source 107. For example, when the light source 107 is a discharge lamp, the light source driver 106 has a ballast substrate that generates a high voltage for discharge. In addition, when the light source 107 is a solid light source such as a laser, the light source driver 106 has a driving circuit mounted with a constant current driver.

The light source 107 is configured from a discharge lamp or a solid light source such as a laser and an LED. In this embodiment, the solid light source, which is easy to perform a light quantity control quickly and precisely, is used as the light source 107, but the discharge lamp may be used if the light quantity control is performable. When using the solid light source, to complement a missing color in the light source, light irradiated to some phosphors is also used together.

The light emitted from the light source 107 is adjusted by an optical element such as a mirror and a lens provided in an illumination optical system 109. A diaphragm driver 108 is configured from an electric circuit including a driver IC and the like, and a diaphragm driving motor, and changes the diaphragm position of the shutter diaphragm 109a under the control of the diaphragm controller 104b. The shutter diaphragm 109a is configured from a light shielding plate, a motor, a gear and the like.

The light adjusted by the illumination optical system 109 is incident on a light modulator 110. The light modulator 110 includes a color separation optical system 110a, a liquid crystal panel 110b, and a color combining optical system 110c. The color separation optical system 110a decomposes the light (white light) from the illumination optical system 109 into three-color lights of R, G and B color (R light, G light and B light). The liquid crystal panel 110b is configured from three light modulation elements, and optically modulates each of the three-color lights. The color combining optical system 110c combines the three-color lights light-modulated by the liquid crystal panel 110b. In such a configuration, the light modulator 110 drives the liquid crystal panel 110b on the basis of the driving signal received from the panel driver 105 and modulates the incident light (performs light modulation). The liquid crystal panel 110b may be a transmissive type or a reflective type. In this embodiment, the liquid crystal panel 110b is used as the light modulation element, but a digital micromirror device (DMD) may be used. In this case, the R light, the G light and the B light sequentially extracted from the white light from the illumination optical system 109 by the color filter sequentially enter one DMD and are optically modulated.

The light modulated by the light modulator 110, that is the image is projected onto a projection surface (not illustrated) such as a screen through a projection optical system (projection unit, projection lens) 111 having an optical system such as a lens and a mirror. The projection optical system 111 may be integrally fixed to the projector 1 or may be exchangeably attached to the projector 1.

Figure 2:
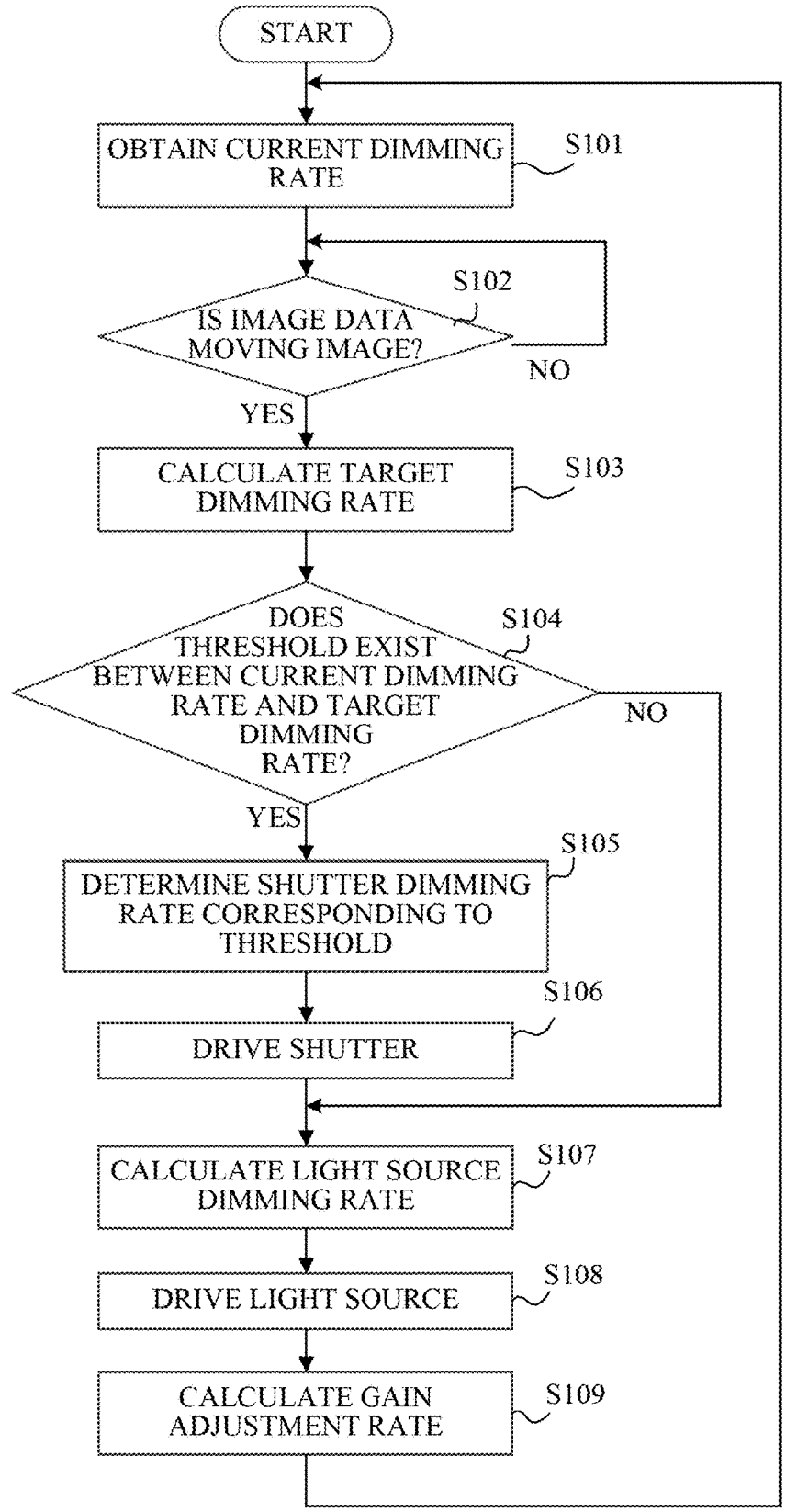
FIG. 2 is a flowchart of a control method to change a dimming rate according to the first embodiment.

Next, referring now to FIG. 2, a description will be given of a control method to change the dimming rate by the controller 104 according to this embodiment (a method to change the dimming rate of the shutter diaphragm 109a and the light source 107 according to the image). FIG. 2 is a flowchart of the control method to change the dimming rate.

In the step S101, the controller 104 obtains a dimming rate (total dimming rate) currently set to the projector 1.

In the step S102, the controller 104 determines whether the image data input to the image signal inputter 101 is a moving image. More specifically, the controller 104 determines whether a sum of absolute values of differences between a previous frame and a current frame is larger than a predetermined threshold. When the image data is the moving data, the flow moves to the step S103, and when the image data is a still image, the loop to the step S102 is repeated.

In the step S103, the target dimming rate calculator 104a calculates the target dimming rate, which is the target value of the light quantity adjustment in the entire projector 1, based on the analysis result obtained from the image analyzer 102.

In the step S104, the diaphragm controller 104c determines whether the threshold set by the threshold setter 104b exists between the current dimming rate obtained in the step S101 and the target dimming rate calculated in the step S103. When the threshold exists between the current diaphragm rate and the target dimming rate, the flow moves to the step S105. When the threshold does not exist between the current dimming rate and the target dimming rate, the shutter diaphragm 109a is not driven, in other words, the current diaphragm position of the shutter diaphragm 109 is maintained, and the flow moves to the step S107.

Here, referring to FIGS. 3A and 4, a description will be given of an example of the threshold corresponding to each diaphragm dimming rate when the diaphragm dimming rate of the shutter diaphragm 109a is settable to 100%, 80%, 60% and 40%. That is, in this embodiment, since the smallest diaphragm dimming rate is 40%, setting the diaphragm dimming rate to 40% or less is impossible. FIG. 3A is table showing an example of the threshold corresponding to the diaphragm dimming rate. FIG. 4 is a graph based on FIG. 3A, the abscissa axis represents the diaphragm dimming rate, and the ordinate axis represents the target dimming rate.

As illustrated in FIG. 3A, upper and lower thresholds are set for each diaphragm dimming rate. The upper threshold is used when the target dimming rate increases relative to the current dimming rate and the lower threshold is used when the target dimming rate decreases relative to the current dimming rate. In this embodiment, the upper threshold is set to a value obtained by subtracting the corresponding diaphragm rate from 5% and the lower threshold is set to a value obtained by subtracting the diaphragm dimming rate lower by one stage than the corresponding diaphragm dimming rate from 15%. That is, when the diaphragm position is set at a predetermined position, the lower threshold, which is used when the target dimming rate decreases from the previous target dimming rate, is set to be smaller than the upper threshold, which is used when the target dimming rate increases from the previous target dimming rate. However, since setting the diaphragm dimming rate to 100% or more, or the smallest diaphragm dimming rate to 40% or less is impossible, the upper threshold when the diaphragm dimming rate is 100% and the lower threshold when the diaphragm dimming rate is 40% is not set.

As illustrated in FIG. 4, the relation between the diaphragm dimming rate and the target dimming rate has hysteresis characteristics when the target dimming rate is between 75% and 65%, between 55% and 45%, and between 35% and 25%. Having such characteristics can suppress the continuous operation of the shutter diaphragm 109a due to frequent changes of the target dimming rate in the vicinity of the specific threshold. The higher hysteresis decreases the frequency of the shutter operation. However, the hysteresis needs to be smaller than the corresponding diaphragm dimming rate. For example, when the diaphragm dimming rate, the current dimming rate and the target dimming rate are respectively 100%, 70% and 60%, the target dimming rate decreases relative to the current dimming rate and thus the diaphragm controller 104c determines that the lower threshold of 65% exists between the current dimming rate and the target dimming rate from FIG. 3A. Further, when the diaphragm dimming rate, the current dimming rate and the target dimming rate are respectively 60%, 40% and 50%, the target dimming rate increases relative to the current dimming rate and thus the diaphragm controller 104c determines that the upper threshold does not exist between the current dimming rate and the target dimming rate from FIGS. 3A and 3B.

In this embodiment, the threshold has the hysteresis characteristics and, as illustrated in FIG. 3B, may have no hysteresis characteristics. In this case, the diaphragm controller 104c determines whether the target dimming rate calculated in the step S103 belongs within the changeable range of the target dimming rate set in the current diaphragm dimming rate obtained in the step S101. When the target dimming rate belongs within the changeable range, the flow moves to the step S105, when the target dimming rate does not belong within the changeable range, the flow moves to the step S107, and if not, the process proceeds to step S107. Even when the threshold does not have the hysteresis characteristics, frequently operations of the shutter diaphragm 109a with the change of the target dimming rate can be suppressed.

In the step S105, the diaphragm controller 104c calculates the diaphragm dimming rate corresponding to the threshold in the step S104. When a plurality of the thresholds exists, the threshold closest to the target dimming rate may be used. For example, when, in the step S104, the diaphragm dimming rate, the current dimming rate and the target dimming rate are respectively 100%, 70% and 60% and it is determined that the lower threshold of 65% exists, the diaphragm controller 104c calculates the diaphragm dimming rate as 80% from FIGS. 3A and 4. Further, when, in the step S104, the diaphragm dimming rate, the current dimming rate and the target dimming rate are respectively 40%, 30% and 70% and it is determined that the upper thresholds of 35% and 55% exist, the upper threshold of 55% is closer to the target dimming rate than that of 35% and thus the diaphragm controller 104c calculates the diaphragm dimming rate as 80% from FIGS. 3A, 3B and 4.

In the step S106, the diaphragm controller 104c first calculates the target diaphragm position of the shutter diaphragm 109a corresponding to the diaphragm dimming rate calculated in the step S105. Subsequently, the diaphragm controller 104c controls the light quantity adjustment by the shutter diaphragm 109a by driving the shutter diaphragm 109a via the diaphragm driver 108 on the basis of the target diaphragm position.

In the step S107, the light source controller 104d first calculates the light source dimming rate based on the target dimming rate calculated in the step S103 and the diaphragm dimming rate calculated in the step S105. Subsequently, the light source controller 104d calculates the light quantity set value of the light source 107 corresponding to the light source dimming rate.

In the step S108, the light source controller 104d drives the light source 107 via the light source driver 106 on the basis of the light quantity set value calculated in the step S107.

In the step S109, the gain rate calculator 104e calculates the gain adjustment rate of the image based on the diaphragm dimming rate calculated in the step S105 and the light source dimming rate calculated in the step S107. The calculated gain adjustment rate is transmitted to the image signal processor 103. After completion of this process, the process is looped by proceeding to step 101 when the process is completed.

Figure 5:
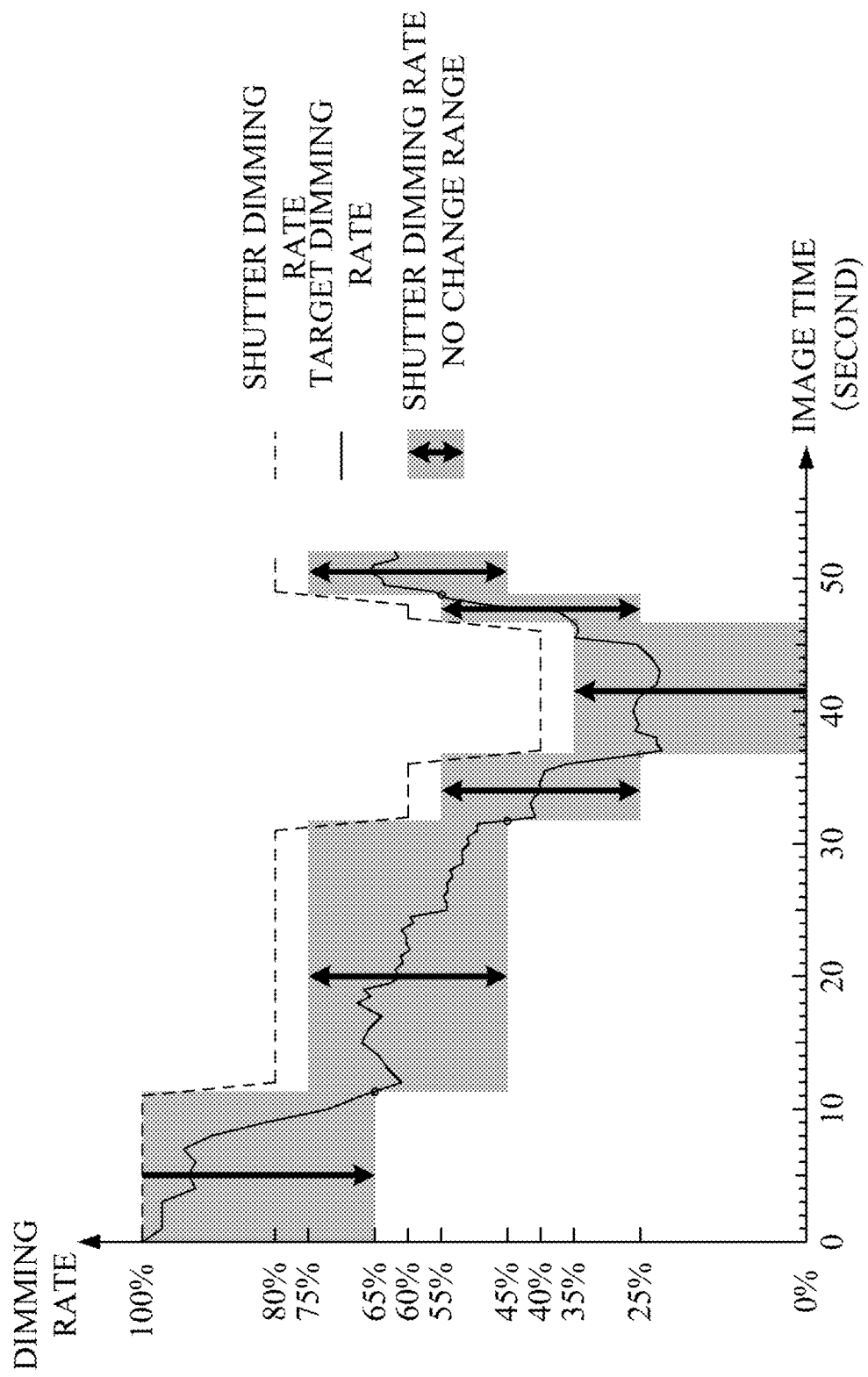
FIG. 5 is a graph showing an example of changes in the target dimming rate and the diaphragm dimming rate.

FIG. 5 is a graph showing an example of changes in the target dimming rate and the diaphragm dimming rate. The abscissa axis and the ordinate axis respectively represent a time and the dimming rate. In FIG. 5, the solid line and the broken line respectively represent the target dimming rate and the diaphragm dimming rate. The gray area represents the range surrounded by the threshold at which the change in the diaphragm dimming rate occurs. In this embodiment, when the current target dimming rate shifts to a gray area different from the gray area to which the previous target dimming rate belongs, the diaphragm dimming rate is changed. The target dimming rate is always lower than the diaphragm dimming rate as illustrated in FIG. 5, but in this embodiment, this gap is compensated by the light source dimming rate. In FIG. 5, the target dimming rate is around the lower threshold of 65% in the vicinity of 10 seconds to 20 seconds, but since the relation between the diaphragm dimming rate and the target dimming rate has the hysteresis characteristics as described above, the continuous operation of the shutter diaphragm 109a is not performed.

As described above, according to this embodiment, even when the light quantity is frequently controlled in accordance with the target dimming rate, the drive of the shutter diaphragm 109a is controlled using the threshold corresponding to the target dimming rate and the diaphragm dimming rate, and thus can be reduced. Accordingly, the driving noise and the deterioration of the diaphragm driving motor due to the continuous operation of the shutter diaphragm 109a can be suppressed.

Second Embodiment

Figure 6:
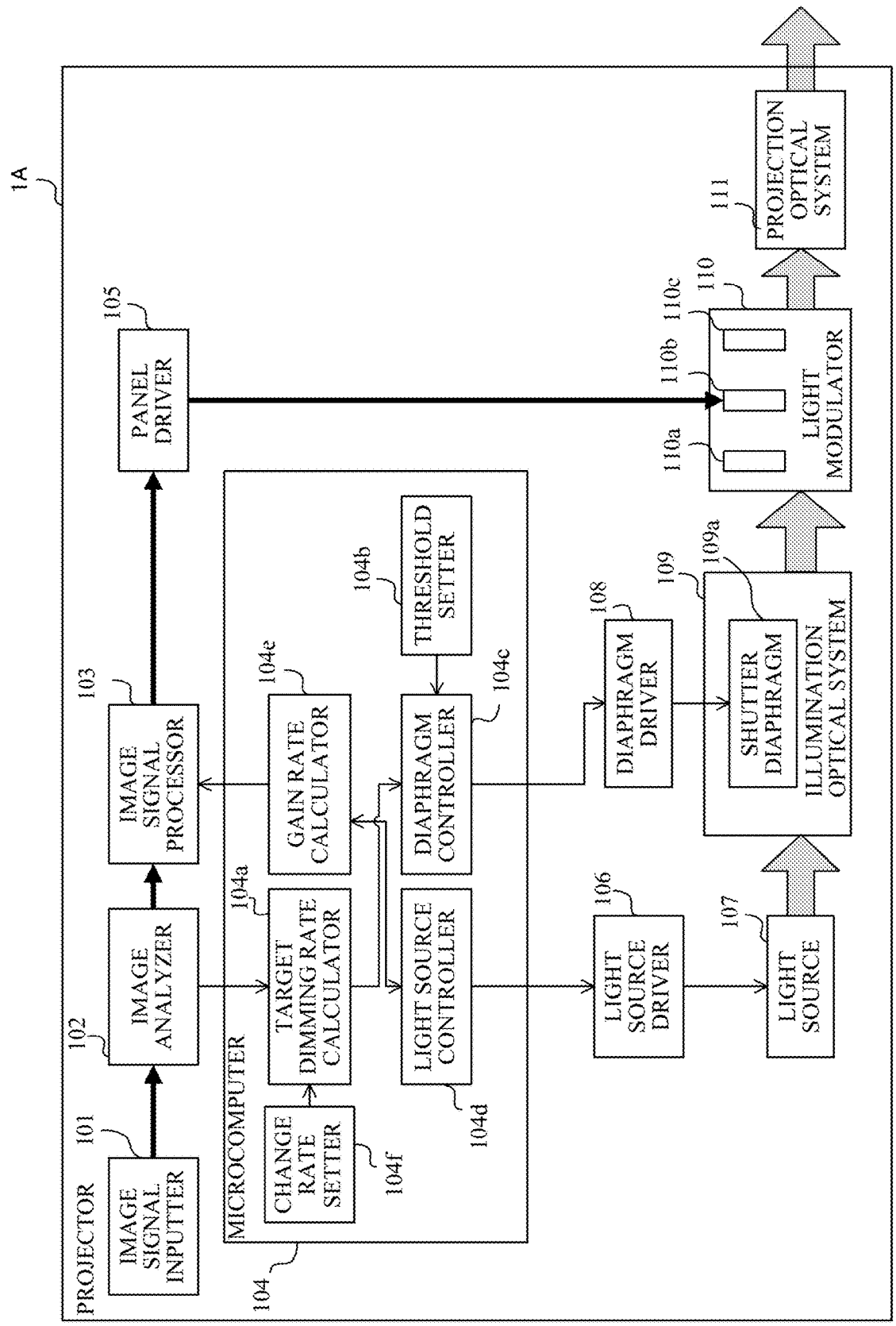
FIG. 6 is a block diagram of a projection display apparatus according to a second embodiment.

First, referring to FIG. 6, a description will be given of a projection display apparatus according to this embodiment. FIG. 6 is a block diagram of a projector IA which is the projection display apparatus according to this embodiment. In this embodiment, components common to the projector 1 according to the first embodiment are denoted by the same reference numerals as those of the first embodiment, and thus a detailed description thereof will be omitted.

When the set number of diaphragm dimming rates increases, the interval between the upper threshold and the lower threshold becomes narrower, and even when the target dimming rate slightly changes, the diaphragm drive motor provided in the diaphragm drive unit 108 is driven. In this embodiment, the controller 104 has a change rate setter 104f to change the threshold corresponding to the set number of the diaphragm dimming rates and the diaphragm dimming rate according to the change rate of the target dimming rate.

The change rate setter 104f sets the change rate of the target dimming rate. The change rate of the target dimming rate is updated in real time for each frame at the fastest rate, but changes of the light quantity occurs with a short period and thus, the user may feel discomfort during viewing. In that case, there is known a method of calculating the target dimming rate in real time and applying a low pass filter (LPF) to the calculation result to moderate the temporal change of the target dimming rate. Depending on the degree of LPF to be set, the change rate of the target dimming rate can be adjusted. The LPF may be applied to either the time axis or the dimming rate axis. When the LPF is applied to the time axis, there is a method of ignoring a change of less than a predetermined time (for example, 10 seconds). When the LPF is applied to the dimming rate axis, it is conceivable that the change rate of the target dimming rate at one time is set to a predetermined value (for example, 1%) or less. Both may be done at the same time.

In this embodiment, the threshold setter 104b sets the step size of the diaphragm dimming rate according to the change rate setter 104f. Furthermore, the threshold setter 104b sets the threshold corresponding to the diaphragm dimming rate in accordance with the step size.

Figure 7:
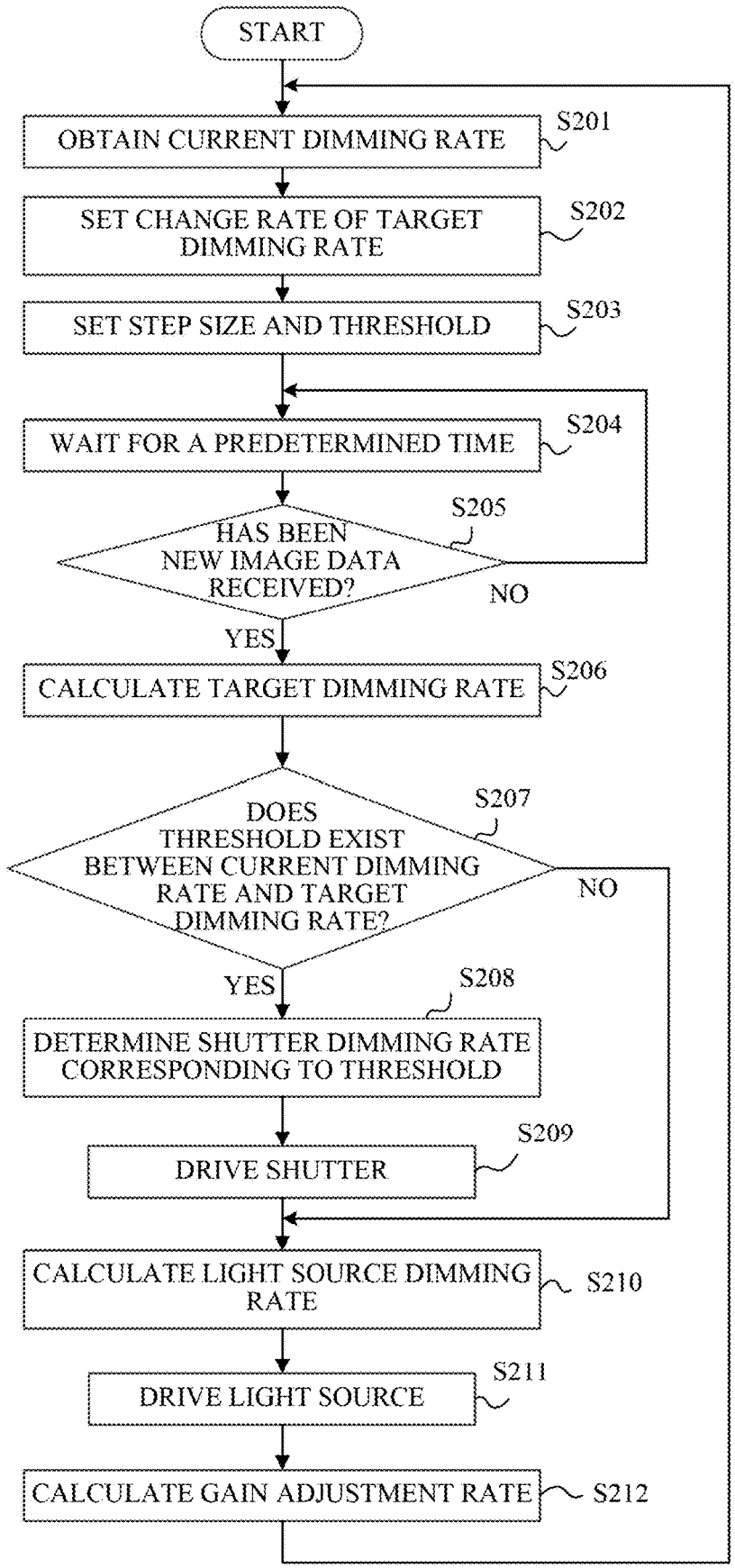
FIG. 7 is a flowchart of a control method to change a dimming rate according to the second embodiment.

Next, referring now to FIG. 7, a description will be given of a control method to change the dimming rate by the controller 104 according to this embodiment. FIG. 7 is a flowchart of the control method to change the dimming rate.

In the step S201, the controller 104 obtains the current set dimming rate of the projector 1.

In the step S202, the change rate setter 104f sets the change rate of the target dimming rate.

In the step S203, the threshold setter 104b sets the step size of the diaphragm dimming rate and the threshold based on the change rate of the target dimming rate set in the step S102. For example, when the change rate per second is set to 5% or less (that is, the maximum change rate is 5%/sec) in the step S202, the threshold setter 104b, as illustrated in FIG. 8, may sets the step size by 10% and the threshold having the hysteresis of more than 5% (15% in FIG. 8). In this case, assuming that the target dimming rate is decreased at a maximum change rate of 5%/sec, the target dimming rate is usually not less than the lower threshold after 1 second but is less than the lower threshold after 2 seconds. Specifically, it is assumed that the current total dimming rate and the current target dimming rate are 80%, newly set (set in the step S206 described below) target dimming rate is 60%, and the target dimming rate decreases at the maximum change rate of 5%/sec. In this case, after 1 second, the target dimming rate is 75% not below the lower threshold (72%), but, after 2 seconds, is 70% below the lower threshold. The same is true when the target dimming rate increases at the maximum change rate of 5%/sec. In other words, it is usually considered that it takes at least 2 seconds or more until the shutter diaphragm 109a operates. Also, even when the target dimming rate varies around threshold, the threshold has the hysteresis of 5% or more, and thus the shutter diaphragm 109a will not operate frequently.

In step S204, the controller 104 waits for the time set by the change rate setter 104f. In the example of the step S203, the controller 104 waits for one second.

In the step S205, the controller 104 determines whether new image data has been received. When the new image data has been received, the flow moves to the step S206, and when the new image data has not been received, the flow returns to the step S204.

In the step S206, the target dimming rate calculator 104a calculates the target dimming rate, which is a target value of the light quantity adjustment in the entire projector 1, based on the analysis result obtained from the image analyzer 102. In this embodiment, the target dimming rate calculator 104a calculates the target dimming rate based on the limitation by the change rate set by the change rate setter 104f.

In the step S207, the diaphragm controller 104c determines whether the threshold set by the threshold setter 104b exists between the current dimming rate obtained in the step S101 and the target dimming rate calculated in the step S206. When the threshold exists between the current diaphragm rate and the target dimming rate, the flow moves to the step S208, and when the threshold does not exist between the current dimming rate and the target dimming rate, the flow moves to the step S210.

In the step S208, the diaphragm controller 104c calculates the diaphragm dimming rate corresponding to the threshold in the step S204.

In the step S209, the diaphragm controller 104c first calculates the target diaphragm position of the shutter diaphragm 109a corresponding to the diaphragm dimming rate calculated in the step S208. Subsequently, the diaphragm controller 104c controls the light quantity adjustment by the shutter diaphragm 109a by driving the shutter diaphragm 109a via the diaphragm driver 108 on the basis of the target diaphragm position.

In the step S210, the light source controller 104d first calculates the light source dimming rate based on the target dimming rate calculated in the step S206 and the diaphragm dimming rate calculated in the step S208. Subsequently, the light source controller 104d calculates the light quantity set value of the light source 107 corresponding to the light source dimming rate.

In the step S211, the light source controller 104d drives the light source 107 via the light source driver 106 on the basis of the light quantity set value calculated in the step S210.

In the step S212, the gain rate calculator 104e calculates the gain adjustment rate of the image based on the diaphragm dimming rate calculated in the step S208 and the light source dimming rate calculated in the step S210. After completion of this process, the process is looped by proceeding to step 101 when the process is completed.

As described above, according to this embodiment, even when the light quantity is frequently controlled in accordance with the target dimming rate, the drive of the shutter diaphragm 109a can be reduced. Further, the driving quantity of the shutter diaphragm 109a can be reduced while finely setting the shutter diaphragm 109a according to the change rate of the target dimming rate. Thus, driving noise and deterioration of the diaphragm driving motor due to continuous operation of the shutter diaphragm 109a can be suppressed.

Third Embodiment

When the shutter diaphragm and the light source are simultaneously controlled according to the input image to improve the contrast, the diaphragm driving speed and the light source control speed are different and thus a flicker may occur in the image. In particular, since the diaphragm driving speed is delayed as compared with the target speed, the flicker occurs in the image. In this embodiment, description will be given of a method of suppressing the flicker.

Figure 9:
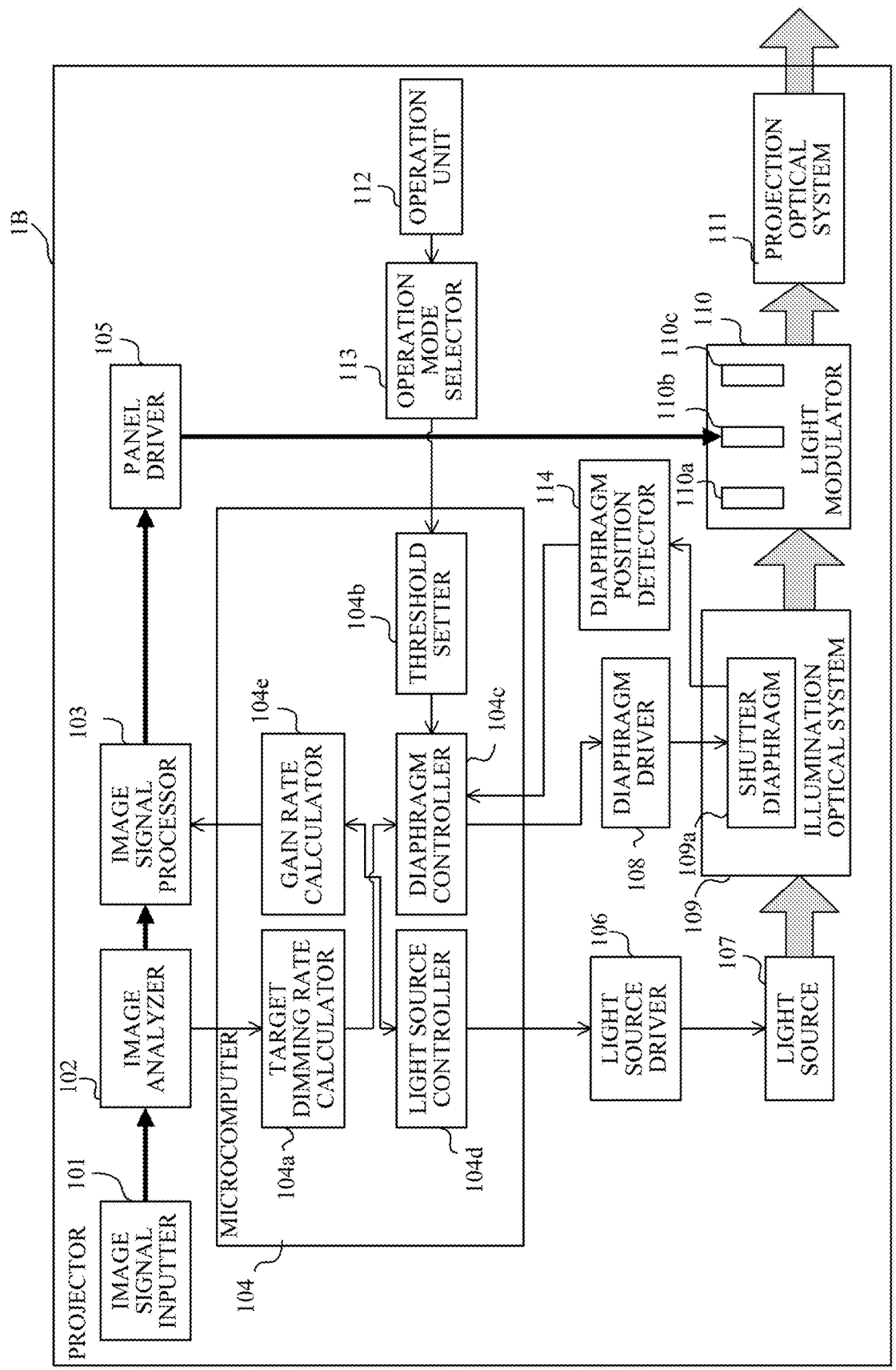
FIG. 9 is a block diagram of a projection display apparatus according to a third embodiment.

First, referring to FIG. 9, a description will be given of a projection display apparatus according to this embodiment. FIG. 9 is a block diagram of a projector 1B which is the projection display apparatus according to this embodiment. In this embodiment, components common to the projector 1 according to the first embodiment are denoted by the same reference numerals as those of the first embodiment, and thus a detailed description thereof will be omitted.

An operation unit 112 is an operation interface for allowing the user to operate the projector 1B. The user can select the operation mode of the projector 1B by operating the operation mode selector 113 via the operation unit 112. In this embodiment, the threshold setter 104b receives the selection result of the operation mode selector 113 and sets the threshold according to the selected operation mode.

In this embodiment, the user can select the contrast priority mode and the silent priority mode. The contrast priority mode is the mode in which the image can be projected with the contrast corresponding to the input image as compared with the silent priority mode by increasing the number of the thresholds set by the threshold setter 104b as compared with the silent priority mode and improving the followability of the diaphragm drive to the target dimming rate. The silent priority mode is the mode in which can reduce the driving sound of the diaphragm driving motor as compared with the contrast priority mode by decreasing the number of the thresholds set by the threshold setter 104b as compared with the contrast priority mode and minifying the drive frequency of the shutter diaphragm 109a. As for the operation mode, various operation modes may be prepared within a scope not deviating from the effect of the present invention.

A diaphragm position detector (detector) 114 can detect the diaphragm position of the shutter diaphragm 109a and transmits the detection result to the diaphragm controller 104b. In this embodiment, the diaphragm controller 104c performs feedback control using the diaphragm position data detected by the diaphragm position detector 114.

Figure 10:
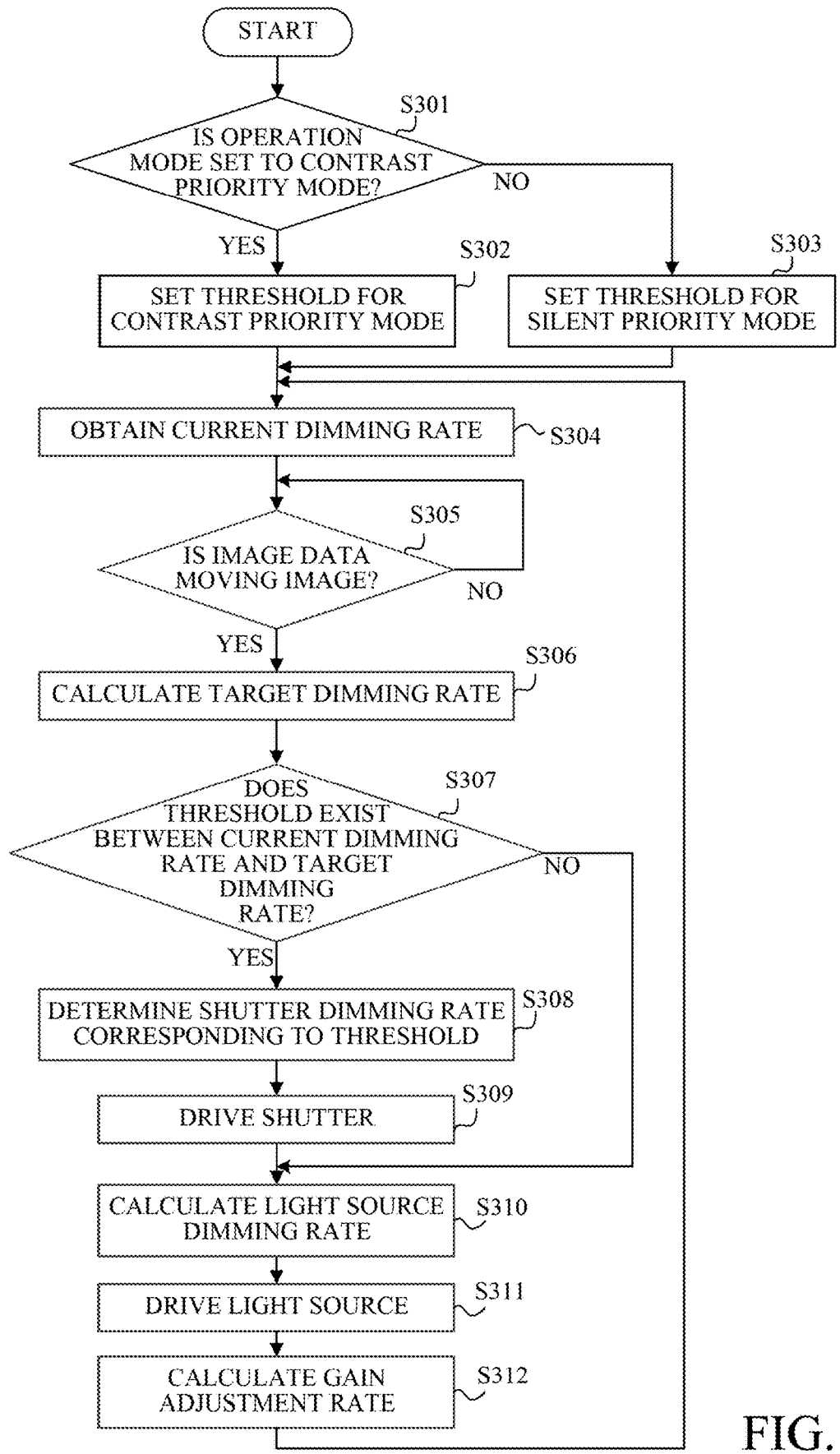
FIG. 10 is a flowchart of a control method to change a dimming rate according to the third embodiment.

Next, referring now to FIG. 10, a description will be given of a control method to change the dimming rate by the controller 104 according to this embodiment. FIG. 10 is a flowchart of the control method to change the dimming rate.

In the step S301, the controller 104 determines whether the current operation mode of the projector 1B is set to the contrast priority mode. When the operation mode is set to the contrast priority mode, the flow moves to the step S302, and when the operation mode is not set to the contrast priority mode, in other words, is set to the silent priority mode, the flow moves to the step S302.

In the step S302, the threshold setter 104b sets a threshold for the contrast priority mode. In this embodiment, the threshold setter 104b sets four thresholds (20%, 40%, 60% and 80%). Table 1-1 shows the relation between the target dimming rate and the diaphragm dimming rate.

In the step S303, the threshold setter 104b sets a threshold for the silent priority mode. In this embodiment, the threshold setter 104b sets two thresholds (40% and 70%). Table 1-2 shows the relation between the target dimming rate and the diaphragm dimming rate.

In this embodiment, unlike the first and second embodiments, for the sake of simplicity, the upper threshold and the lower threshold are not considered. As for the threshold, various thresholds may be set within a scope not deviating from the effect of the present invention.

TABLE 1-1

| Contrast priority mode | |
| --- | --- |
| Target dimming rate | Diaphragm dimming rate |
| under 20% | 20% |
| over 20% to ≤40% | 40% |
| over 40% to ≤60% | 60% |
| over 60% to ≤80% | 80% |
| over 80% | 100% |

Processes from the step S304 to the step S309 are respectively the same as the processes from the step S101 to the step S106 in FIG. 1 and thus a detailed description thereof will be omitted.

In the step S310 the light source controller 104d calculates a light source dimming rate (current light source dimming rate) based on the target dimming rate calculated in the step S306 and the diaphragm dimming rate corresponding to the current diaphragm position of the shutter diaphragm 109a detected by the diaphragm position detector 114. In this embodiment, the diaphragm dimming rate corresponding to the current diaphragm position of the shutter diaphragm 109a is obtained using a correspondence table of the diaphragm position of the shutter diaphragm 109a previously stored in the storage (not illustrated) and the diaphragm dimming rate. Table 2 shows an example of a correspondence table of the diaphragm position and the diaphragm dimming rate. The light source controller 104d calculates the difference between the target dimming rate and the diaphragm dimming rate as the light source dimming rate. The difference between the target dimming rate and the diaphragm dimming rate is caused by the delay of the diaphragm driving.

TABLE 2

| Diaphragm position (Opening diameter)[mm] | 50 | 49 | 48 | 47 | 46 | 45 | 44 | 43 |
| --- | --- | --- | --- | --- | --- | --- | --- | --- |
| Diaphragm Dimming rate[%] | 100.0 | 100.0 | 99.9 | 99.9 | 99.9 | 99.9 | 99.7 | 99.3 |
| Diaphragm position (Opening diameter)[mm] | 42 | 41 | 40 | 39 | 38 | 37 | 36 | 35 |
| Diaphragm Dimming rate[%] | 99.0 | 98.6 | 97.9 | 96.9 | 96.0 | 95.4 | 94.6 | 93.6 |
| Diaphragm position (Opening diameter)[mm] | 34 | 33 | 32 | 31 | 30 | 29 | 28 | 27 |
| Diaphragm Dimming rate[%] | 92.0 | 90.5 | 89.1 | 87.3 | 85.1 | 82.3 | 78.7 | 74.6 |
| Diaphragm position (Opening diameter)[mm] | 26 | 25 | 24 | 23 | 22 | 21 | 20 | 19 |
| Diaphragm Dimming rate[%] | 70.2 | 65.9 | 61.9 | 58.1 | 54.6 | 50.8 | 47.4 | 43.6 |
| Diaphragm position (Opening diameter)[mm] | 18 | 17 | 16 | 15 | 14 | 13 | 12 | 11 |
| Diaphragm Dimming rate[%] | 39.9 | 36.4 | 33.0 | 29.7 | 26.4 | 23.4 | 20.7 | 18.3 |

TABLE 1-2

| Silent priority mode | |
| --- | --- |
| Target dimming rate | Diaphragm dimming rate |
| under 40% | 40% |
| over 40% to ≤70% | 70% |
| over 70% | 100% |

Processes from the step S311 and step S312 are respectively the same as the processes from the step S108 and the step S109 in FIG. 1 and thus a detailed description thereof will be omitted.

As described above, according to this embodiment, even when the light quantity is frequently controlled in accordance with the target dimming rate, the drive of the shutter diaphragm 109a can be reduced. Thus, driving noise and deterioration of the diaphragm driving motor due to continuous operation of the shutter diaphragm 109a can be suppressed. Further, in this embodiment, the light source dimming rate is calculated as the difference, which is caused by the delay in the diaphragm driving, between the diaphragm dimming rate corresponding to the diaphragm position of the current shutter diaphragm 109a and the target dimming rate. That is, in this embodiment, the light source is controlled to correct (eliminate) the difference, which is caused by the delay in the diaphragm driving, between the diaphragm dimming rate and the target dimming rate corresponding to the diaphragm position of the current shutter diaphragm 109a. Thus, even when the shutter diaphragm and the light source are controlled according to the input image to improve the contrast, the flicker generated in the image due to the delay of the diaphragm driving can be suppressed.

Fourth Embodiment

Figure 11:
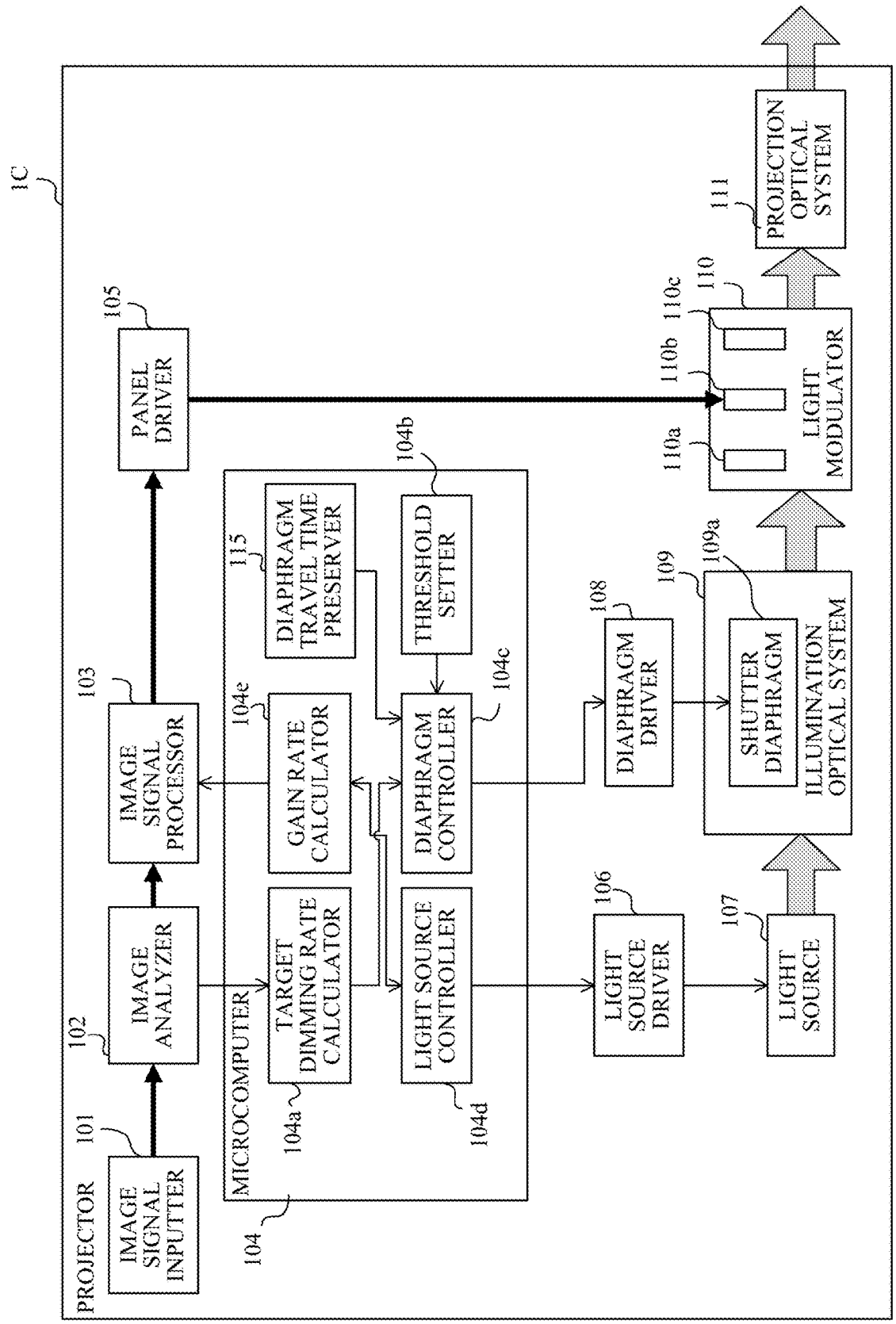
FIG. 11 is a block diagram of a projection display apparatus according to a fourth embodiment.

First, referring to FIG. 11, a description will be given of a projection display apparatus according to this embodiment. FIG. 11 is a block diagram of a projector 1C which is the projection display apparatus according to this embodiment. In this embodiment, components common to the projector 1 according to the first embodiment are denoted by the same reference numerals as those of the first embodiment, and thus a detailed description thereof will be omitted. The diaphragm position of the shutter diaphragm 109a is directly detected by the diaphragm position detector in the third embodiment, but in this embodiment, as described later, is predicted using a diaphragm travel time obtained from the diaphragm position before the drive, the target diaphragm position, and a diaphragm travel time preserver 115.

The diaphragm travel time preserver 115 preserves the time (diaphragm travel time) required when the shutter diaphragm 109a moves.

In this embodiment, the diaphragm controller 104c drives the diaphragm driver 108 using an actuator whose driving quantity is determined by the number of pulses to be applied such as a stepping motor. Further, the diaphragm controller 104c predicts the diaphragm position of the shutter diaphragm 109a during the movement using the diaphragm position of the shutter diaphragm 109a before the drive, the target diaphragm position, and the diaphragm travel time obtained from the diaphragm travel time preserver 115. Table 3 shows the relationship among the diaphragm position of the shutter diaphragm 109a before the start of the drive, the target diaphragm position, and the time required for the movement of the shutter diaphragm 109a stored in the diaphragm travel time preserver 115.

TABLE 3

| Diaphragm position before start of drive | Diaphragm target position | Diaphragm travel time | Diaphragm position before start of drive | Diaphragm target position | Diaphragm travel time |
|---|---|---|---|---|---|
| 20% | 40% | 33 msec | 40% | 20% | 33 msec |
| 20% | 60% | 50 msec | 60% | 20% | 50 msec |
| 20% | 80% | 66 msec | 80% | 20% | 66 msec |
| 20% | 100% | 83 msec | 100% | 20% | 83 msec |
| 40% | 20% | 33 msec | 20% | 40% | 33 msec |
| 40% | 60% | 33 msec | 60% | 40% | 33 msec |
| 40% | 80% | 50 msec | 80% | 40% | 50 msec |
| 40% | 100% | 66 msec | 100% | 40% | 66 msec |
| 60% | 20% | 50 msec | 20% | 60% | 50 msec |
| 60% | 40% | 33 msec | 40% | 60% | 33 msec |
| 60% | 80% | 33 msec | 80% | 60% | 33 msec |
| 60% | 100% | 50 msec | 100% | 60% | 50 msec |
| 80% | 20% | 66 msec | 20% | 80% | 66 msec |
| 80% | 40% | 50 msec | 40% | 80% | 50 msec |
| 80% | 60% | 33 msec | 60% | 80% | 33 msec |
| 80% | 100% | 33 msec | 100% | 80% | 33 msec |
| 100% | 20% | 83 msec | 20% | 100% | 83 msec |
| 100% | 40% | 66 msec | 40% | 100% | 66 msec |
| 100% | 60% | 50 msec | 60% | 100% | 50 msec |
| 100% | 80% | 33 msec | 80% | 100% | 33 msec |

Figure 12:
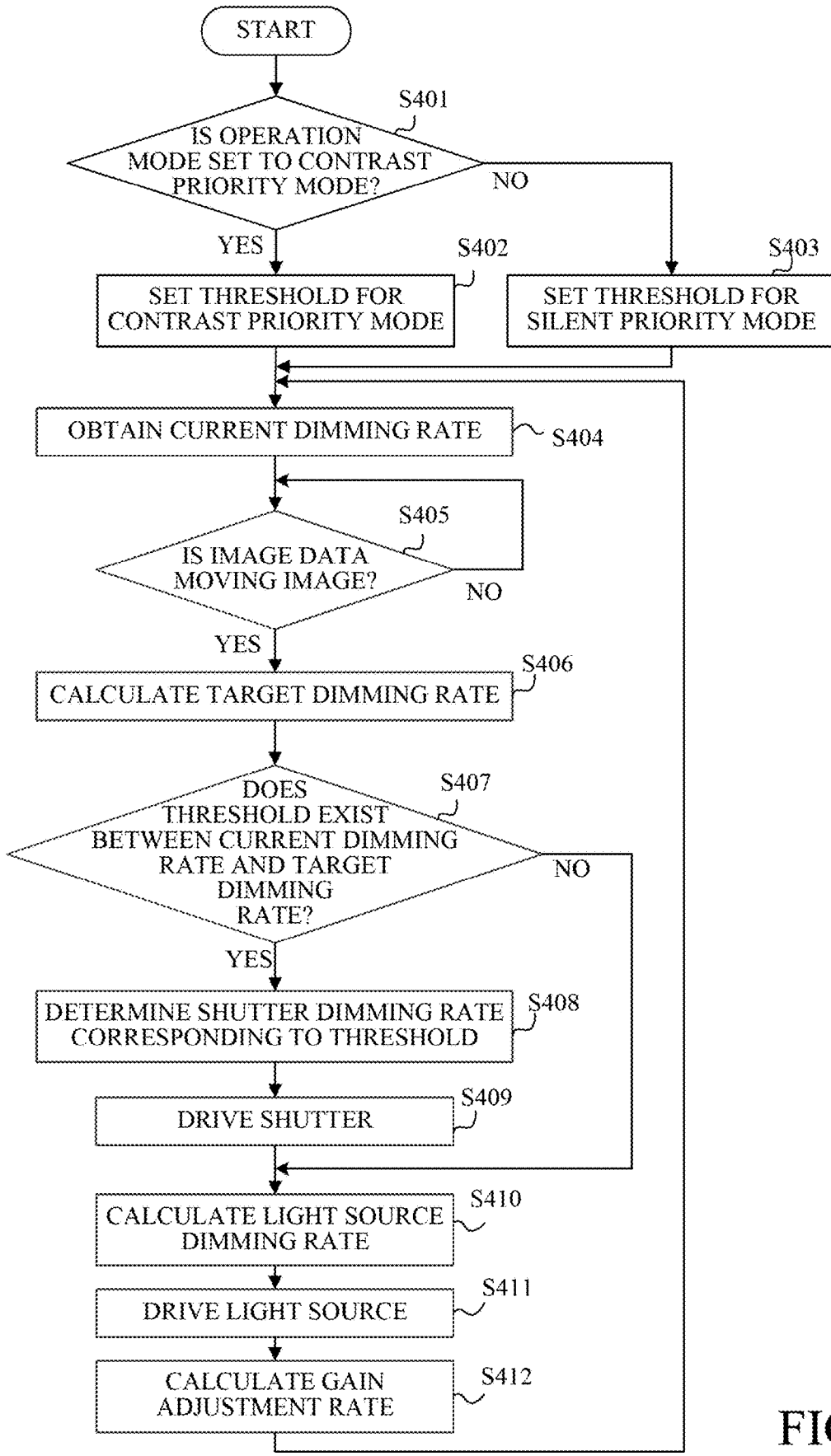
FIG. 12 is a flowchart of a control method to change a dimming rate according to the fourth embodiment.

Next, referring now to FIG. 12, a description will be given of a control method to change the dimming rate by the controller 104 according to this embodiment. FIG. 12 is a flowchart of the control method to change the dimming rate.

Processes from the step S401 to the step S408 are respectively the same as the processes from the step S301 to the step S308 in FIG. 10 and thus a detailed description thereof will be omitted.

In the step S409, the diaphragm controller 104c first calculates the target diaphragm position of the shutter diaphragm 109a corresponding to the diaphragm dimming rate calculated in the step S408. Subsequently, the diaphragm controller 104c drives the diaphragm shutter 109a via the diaphragm driver 108 while predicting the diaphragm position during the movement using the diaphragm position of the shutter diaphragm 109a before the start of the drive, the target diaphragm position, and the travel time obtained from the diaphragm travel time preserver 115 diaphragm obtained from 115.

In the step S410, the light source controller 104d calculates the light source dimming rate based on the target dimming rate calculated in the step S406 and the diaphragm dimming rate corresponding to the diaphragm position predicted in the step S409. In this embodiment, the diaphragm dimming rate corresponding to the current diaphragm position of the shutter diaphragm 109a is obtained using a correspondence table of the diaphragm position of the shutter diaphragm 109a previously stored in the storage (not illustrated) and the diaphragm dimming rate. The light source controller 104d calculates the difference between the target dimming rate and the diaphragm dimming rate as the light source dimming rate. The difference between the target dimming rate and the diaphragm dimming rate is caused by the delay of the diaphragm driving.

Processes from the step S411 and the step S412 are respectively the same as the processes from the step S311 and the step S312 in FIG. 10 and thus a detailed description thereof will be omitted.

As described above, according to this embodiment, even when the light quantity is frequently controlled in accordance with the target dimming rate, the drive of the shutter diaphragm 109a can be reduced. Thus, driving noise and deterioration of the diaphragm driving motor due to continuous operation of the shutter diaphragm 109a can be suppressed. Further, in this embodiment, the light source dimming rate is calculated as the difference, which is caused by the delay in the diaphragm driving, between the diaphragm dimming rate corresponding to the diaphragm position of the current shutter diaphragm 109a and the target dimming rate. That is, in this embodiment, the light source is controlled to correct (eliminate) the difference, which is caused by the delay in the diaphragm driving, between the diaphragm dimming rate and the target dimming rate corresponding to the diaphragm position of the current shutter diaphragm 109a. Thus, even when the shutter diaphragm and the light source are controlled according to the input image to improve the contrast, the flicker generated in the image due to the delay of the diaphragm driving can be suppressed.

Fifth Embodiment

Figure 13:
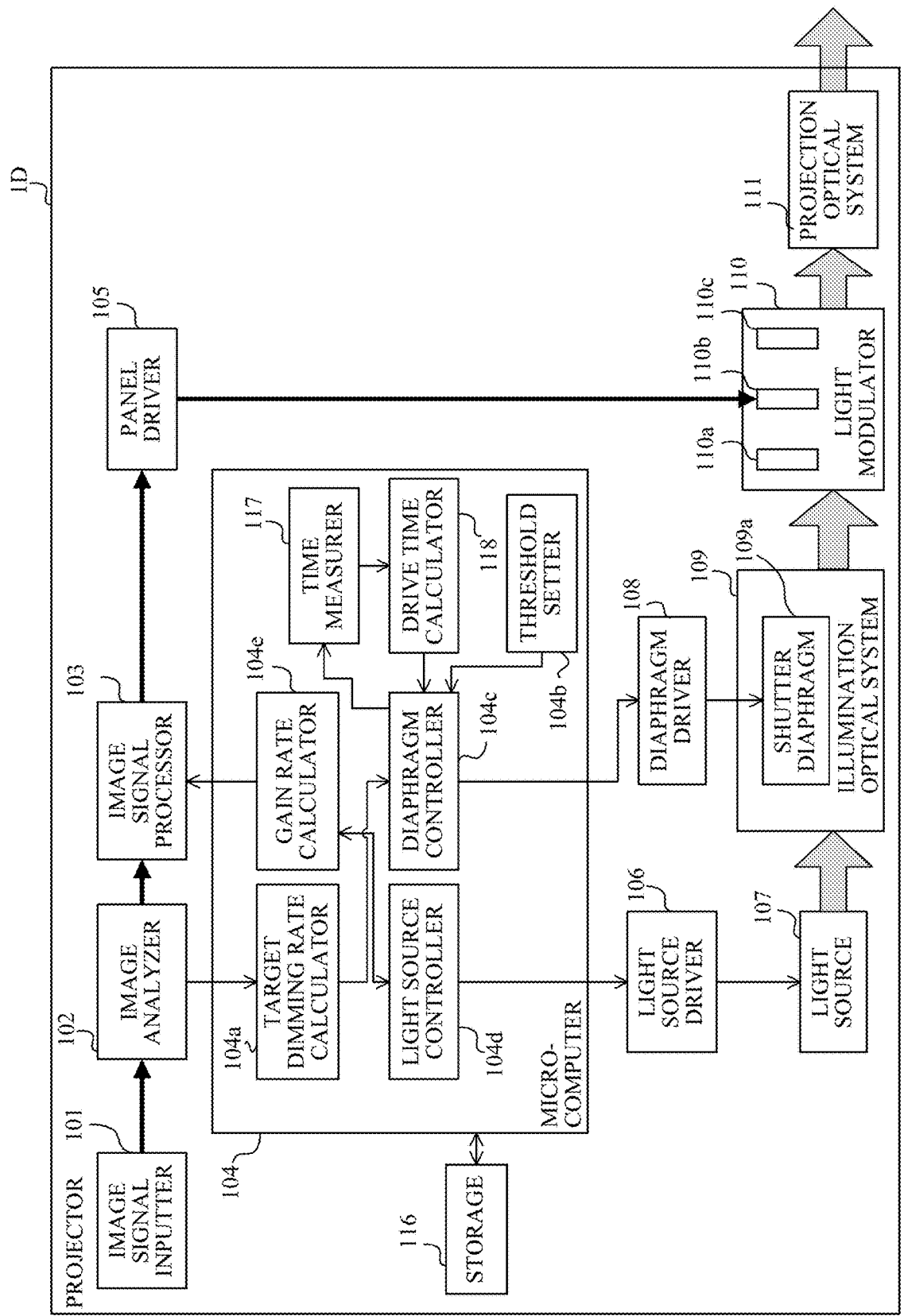
FIG. 13 is a block diagram of a projection display apparatus according to a fifth embodiment.

First, referring to FIG. 13, a description will be given of a projection display apparatus according to this embodiment. FIG. 13 is a block diagram of a projector 1D which is the projection display apparatus according to this embodiment. In this embodiment, components common to the projector 1 according to the first embodiment are denoted by the same reference numerals as those of the first embodiment, and thus a detailed description thereof will be omitted.

A time measurer 117 measures the time during which the diaphragm controller 104 c controls the diaphragm driver 108, that is, the time during which the diaphragm driver 108 drives the shutter diaphragm 109a, and outputs the results to the calculator 118 as the drive time.

A drive time calculator 118 reads the total drive time (initial value is 0) stored in the storage 116 and adds the drive time input from the time measurer 117 to the total drive time. The total drive time calculated by the drive time calculator 118 is stored in the storage 116.

The storage 116 further stores at least one switching reference time (predetermined time threshold) which is a reference for switching the driving frequency of the diaphragm. As switching reference time, the time shorter than a predetermined drivable time (life) of the diaphragm driver 108, for example, the time which is 80% of the drivable time of the diaphragm driver 108 is stored. In this embodiment, using the time which is 80% of the drivable time of the diaphragm driver 108 as the switching reference time will be described.

The diaphragm controller 104c reads the switching reference time stored in the storage 116 and the total drive time calculated by the drive time calculator 118, maintains the current operation mode when the total drive time is shorter than the switching reference time, and switches the operation mode when the total drive time is equal to or longer than the switching reference time. In this embodiment, when the drive time is shorter than the switching reference time, the control of the diaphragm driver 108 and the drive of the shutter diaphragm 109 are performed by the contrast priority mode shown in the Table 1-1 according to the third embodiment, and when the drive time is equal to or longer than the switching reference time, the control of the diaphragm driver 108 and the drive of the shutter diaphragm 109 are performed by the silent priority mode shown in the Table 1-2 according to the third embodiment.

In other words, when the total drive time is equal to or longer than greater than the switching reference time, the diaphragm controller 104c controls the diaphragm driving section 108 and set so that the number of the settable dimming rates of the shutter diaphragm 109a is smaller than those when the total drive time is shorter than the predetermined time threshold. As a result, driving frequency of the diaphragm driver 108 and the shutter diaphragm 109a are reduced.

Figure 14:
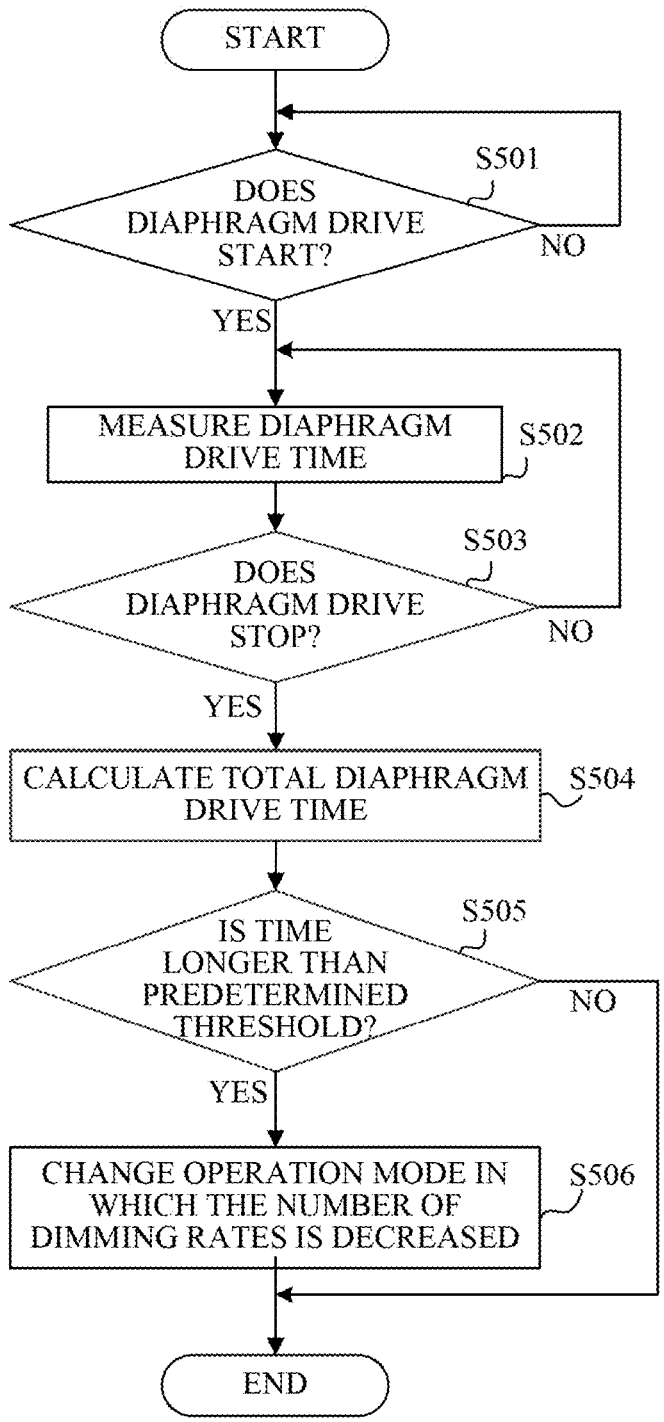
FIG. 14 is a flowchart of a control method to control a diaphragm according to the fifth embodiment.

Next, referring now to FIG. 14, a description will be given of a control method to change the dimming rate by the controller 104 according to this embodiment. FIG. 14 is a flowchart of the control method to change the dimming rate.

In the step S501, whether the diaphragm controller 104c starts the drive of the shutter diaphragm 109a by controlling the diaphragm driver 108 is determined. When the drive of the shutter diaphragm 109a is started, the flow moves to the step S502, and when the drive of the shutter diaphragm 109a is not started, the flow returns to the step S501.

In the step S502, the time measurer 117 starts the measurement of the drive time in which the diaphragm controller 104c controls the diaphragm driver 108 to drive the shutter diaphragm 109a by the diaphragm driver 108.

In the step S503, whether the drive of the shutter diaphragm by the diaphragm driver 108 is stopped is determined. When the drive of the shutter diaphragm 109a is stopped, the flow moves to the step S504, and when the drive of the shutter diaphragm 109a is not stopped, the flow returns to the step S502 to continue the measurement of the drive time.

In the step S504, the time measurer 117 stops the measurement of the drive time in which the diaphragm driver 108 drives the shutter diaphragm 109a, and new total drive time is calculated from the measured drive time and the total drive time stored in the storage 116.

In the step S505, whether the total drive time is equal to or longer than the switching reference time is determined. When the total drive time is equal to or longer than the switching reference time, the flow moves to the step S506, and when the total drive time is shorter than the switching reference time, the flow ends.

In the step S506, the operation mode when the diaphragm driver 108 drive the shutter diaphragm 109a is set to the operation mode (silent priority mode) in which the number of the dimming rates settable to the shutter diaphragm 109a decreases and the flow ends.

As described above, according to this embodiment, when the dimming rate is controlled according to the target dimming rate and the total drive time is equal to or longer than the switching reference time, the number of dimming rates of the settable shutter diaphragm 109a is set to be smaller than the number of dimming rates when the total drive time is smaller than the predetermined time threshold. That is, when the drive time of the diaphragm driver 108 and the shutter diaphragm 109a is longer than the predetermined time threshold, the driving frequency of the diaphragm driver 108 and the shutter diaphragm 109a can be reduced. Thus, deterioration due to continuous operation of the diaphragm driver 108 and the shutter diaphragm 109a can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In addition, a time delay for processing occurs between the time when the image signal is input to the image signal inputter 101 and the time when the liquid crystal panel 110b is driven to perform light modulation. Thus, the controller 104 may include an image delay time obtainer that obtains an image delay time (image processing time) for the projection state. Dimming the shutter diaphragm 109a and the light source unit 107 in accordance with the image delay time obtained by the image delay time obtainer, can realize dimming with real time characteristics according to a change in the projected image.

This application claims the benefit of Japanese Patent Application No. 2017-169116 filed on Sep. 4, 2017 which is hereby incorporated by reference herein in its entirety.

What is claimed is:

1. A control apparatus comprising:
a calculator that calculates a target dimming rate of a projection display apparatus based on a feature quantity of image data;
a diaphragm controller that controls a diaphragm position of a diaphragm based on a target diaphragm position corresponding to the target dimming rate; and
a light source controller that controls a light quantity of a light source on the basis of the target dimming rate and a dimming rate corresponding to the target diaphragm position.

2. The control apparatus according to claim 1, wherein the diaphragm controller maintains the diaphragm at a current diaphragm position when the target dimming rate belongs to a range in which the current diaphragm position of the diaphragm is set as the target diaphragm position, and changes the diaphragm position of the diaphragm when the target dimming rate does not belong to the range in which the current diaphragm position of the diaphragm is set as the target diaphragm position.

3. The control apparatus according to claim 2, wherein, when the target dimming rate belongs to the range in which the current diaphragm position of the diaphragm is set as the target diaphragm position, the diaphragm controller maintains the diaphragm at the current diaphragm position when a threshold being an end value of the range in which the current diaphragm position is set does not exist between a total dimming rate currently set to the projection apparatus and the target dimming rate, and changes the diaphragm position of the diaphragm when the threshold exists between the total dimming rate and the target dimming rate.

4. The control apparatus according to claim 3, wherein the diaphragm controller uses a first threshold as the threshold when the total dimming rate is larger than the target dimming rate, and uses a second threshold larger than the first threshold as the threshold when the total dimming rate is smaller than the target dimming rate.

5. The control apparatus according to claim 1, wherein the light source controller controls the light quantity of the light source on the basis of a light source dimming rate calculated using the target dimming rate and the dimming rate corresponding to the target diaphragm position of the diaphragm.

6. The control apparatus according to claim 5, wherein the light source controller obtains the current diaphragm position of the diaphragm from a detector that detects the diaphragm position of the diaphragm.

7. The control apparatus according to claim 5, wherein the light source controller calculates the current diaphragm position of the diaphragm based on the current diaphragm position of the diaphragm, the target diaphragm position, and a travel time of the diaphragm.

8. The control apparatus according to claim 1, further comprising a gain calculator that calculates a gain adjustment rate used for gain processing on the image data based on a light source dimming rate of the light source calculated using the target dimming rate and the dimming rate corresponding to the target diaphragm position of the diaphragm.

9. The control apparatus according to claim 1, further comprising a setter that sets a changeable range of the target dimming rate for each diaphragm position of the diaphragm settable by the diaphragm controller.

10. The control apparatus according to claim 9, wherein the setter sets the number of diaphragm positions settable by the diaphragm controller and the changeable range according to a change rate of the target dimming rate.

11. The control apparatus according to claim 9, wherein the setter sets the number of diaphragm positions settable by the diaphragm controller and the changeable range according to operation modes set to the projection display apparatus.

12. The control apparatus according to claim 11,
wherein the operation modes set to the projection display apparatus are a silent priority mode and a contrast priority mode, and
wherein the setter sets so that the number of the diaphragm positions settable by the diaphragm controller when the projection display apparatus is set to the silent priority mode is smaller than the number of the diaphragm positions settable by the diaphragm controller when the projection display apparatus is set to the contrast priority mode.

13. The control apparatus according to claim 9, further comprising:
a time measurer that measures a drive time of the diaphragm;
a drive time calculator that calculates a total drive time of the diaphragm; and
a storage that stores the total drive time,
wherein the setter sets so that the number of target diaphragm positions settable by the diaphragm controller when the total drive time is larger than a predetermine time threshold is smaller than the number of target diaphragm positions settable by the diaphragm controller before the total drive time is larger than the predetermined time threshold.

14. The control apparatus according to claim 1, wherein the diaphragm controller controls the diaphragm position of the diaphragm using a motor.

15. The control apparatus according to claim 1, wherein a dimming rate corresponding to the target diaphragm position is larger than the target dimming rate.

16. A projection display apparatus comprising a control apparatus,
wherein the control apparatus includes:
- a calculator that calculates a target dimming rate of a projection display apparatus based on a feature quantity of image data;
- a diaphragm controller that controls a diaphragm position of a diaphragm based on a target diaphragm position corresponding to the target dimming rate; and
- a light source controller that controls a light quantity of a light source on the basis of the target dimming rate and a dimming rate corresponding to the target diaphragm position.

17. A non-transitory computer-readable storage medium configured to store a computer program that enables a computer to be functioned as each unit of a control apparatus,
wherein the control apparatus includes:
- a calculator that calculates a target dimming rate of a projection display apparatus based on a feature quantity of image data;
- a diaphragm controller that controls a diaphragm position of a diaphragm based on a target diaphragm position corresponding to the target dimming rate; and
- a light source controller that controls a light quantity of a light source on the basis of the target dimming rate and a dimming rate corresponding to the target diaphragm position.

* * * * *